(12) United States Patent
Garcia-Atance Fatjo

(10) Patent No.: US 11,364,966 B2
(45) Date of Patent: Jun. 21, 2022

(54) TRICYCLE WITH DUAL STEERING HANDLEBARS

(71) Applicant: Gonzalo Garcia-Atance Fatjo, Guadalajara (ES)

(72) Inventor: Gonzalo Garcia-Atance Fatjo, Guadalajara (ES)

( * ) Notice: Subject to any disclaimer, the term of this patent is extended or adjusted under 35 U.S.C. 154(b) by 455 days.

(21) Appl. No.: 16/598,002

(22) Filed: Oct. 10, 2019

(65) Prior Publication Data
US 2020/0122803 A1 Apr. 23, 2020

(30) Foreign Application Priority Data

Oct. 18, 2018 (ES) .............................. ES201831583U

(51) Int. Cl.
*B62K 5/06* (2006.01)
*B62K 15/00* (2006.01)
*B62K 21/12* (2006.01)

(52) U.S. Cl.
CPC ................ *B62K 5/06* (2013.01); *B62K 15/00* (2013.01); *B62K 21/12* (2013.01); *B62K 2015/001* (2013.01)

(58) Field of Classification Search
CPC ........... B62K 5/06; B62K 15/00; B62K 21/12
See application file for complete search history.

(56) References Cited

U.S. PATENT DOCUMENTS

| 5,730,453 | A  | * | 3/1998 | Owsen | B62K 5/10 |
| | | | | | 280/282 |
| 10,189,524 | B2 | * | 1/2019 | Schafer | B62J 17/02 |
| 2007/0152422 | A1 | * | 7/2007 | Lin | B62K 5/10 |
| | | | | | 280/275 |
| 2020/0094903 | A1 | * | 3/2020 | Weber | B62K 5/027 |
| 2020/0262503 | A1 | * | 8/2020 | Garcia-Atance Fatjo | |
| | | | | | B62D 9/02 |

* cited by examiner

*Primary Examiner* — Jonathan Ng
*Assistant Examiner* — James J Triggs
(74) *Attorney, Agent, or Firm* — Lucas & Mercanti LLP

(57) ABSTRACT

A tricycle that allows riding in adequate conditions over any type of terrain is disclosed, the tricycle having a structural frame onto which a seat and several pedals are incorporated, equipped with a rolling assembly made up of one rear wheel and two parallel front wheels, with the front wheels incorporated into two mounting forks equipped with several respective stems projecting upwards.

5 Claims, 15 Drawing Sheets

TRICYCLE WITH DUAL STEERING HANDLEBARS

CROSS-REFERENCE TO RELATED APPLICATION

This application claims the benefit of priority from Spanish Patent Application No. U201831583, filed Oct. 18, 2018, which is incorporated herein by reference.

TECHNICAL FIELD

The present invention is related to tricycles intended for use on steep and rough terrain, proposing a tricycle of this type designed with features that improve riding conditions and stability, both at high and low speeds, on any type of terrain.

STATE OF THE ART

There are tricycles intended for travel over off-road or mountainous terrain which may be steep and rough, wherein several specific conditions of adaptation are required to ensure safe and efficient riding.

In this sense, tricycles made up of one rear wheel and two parallel front wheels have been developed, with the front wheels associated with a steering system to control the ride and in mount that tilts in regard to height to adapt the support to irregularities and alterations of the riding terrain.

One embodiment of tricycles of this type comprises a steering handlebar, by means of which the user can control the ride by orienting the front wheels of the tricycle as needed during travel, with said front wheels installed in a mount that tilts in regard to height that adapts the position of said front wheels of the tricycle according to the support that they encounter on the terrain over which they are travelling.

This embodiment allows effective travel at high speeds, such as in descents over rough terrain, but it offers little stability at low speeds, for example during ascents over rough terrain, because the adaptation of the position in regard to height of the front wheels of the tricycle is not controlled by the user and balance is maintained solely by the action of the steering, which is limited at low speeds.

There is also an embodiment of tricycles of this type that is equipped with two front wheels associated with corresponding steering handlebars, by means of which the user can also perform an action on the direction of tilting of the height of the position of said wheels to adapt the support to irregularities of the riding terrain.

This embodiment enables better control at low riding speeds, for example during ascents over rough terrain, but the ability to control the steering at high speeds, for example during descents over rough terrain, provides must less safety of control by the user than with a single steering handlebar.

In response to the drawbacks of the known solutions, it is therefore necessary to develop a tricycle in which the user can effectively control both the steering of the ride as well as the adaptation of the support over the irregularities of rough terrain, in order to ensure the stability and safety of use of the tricycle in any circumstances and over any riding terrain.

OBJECT OF THE INVENTION

The present invention discloses a tricycle designed to travel in adequate conditions over rough and irregular terrain, with several features of embodiment that improve the safety and effectiveness of riding under these circumstances.

This tricycle the object of the invention comprises a movement assembly made up of one rear wheel associated with a propulsion system and two parallel front wheels associated with a steering system, with the front wheels incorporated on corresponding mounting forks, with are connected to a central steering handlebar, by means of several rods that are connected to respective upper stems of the forks and a lower stem of the central handlebar by means of ball joints, in addition, with several crossbars extending between several tubes that are arranged with the possibility of rotating on the upper stems of the forks and which are connected to said tubes and to a substructure of the structural frame by means of pivoting joints, with several grip handles installed at the upper end of the upper stems of the forks that serve as lateral handlebars.

This allows the front wheels of the tricycle to be steered to ride the tricycle by means of the central handlebar, while the handles of the lateral handlebars can also be used to steer the front wheels of the tricycle, and at the same time, exert an action of tilting the height of said front wheels of the tricycle, to adapt the support of the wheels to the irregularities of the riding terrain and maintain balance without the need to use the steering, which is especially useful when riding at low speeds or in reverse.

This enables the tricycle to travel efficiently over any type of terrain and in any circumstances of movement, with good conditions of stability and adequate control by the user, for example, on laterally sloping terrain, because the front wheels of the tricycle adapt their height in function of the points of support on the terrain that correspond to them during movement, with the user able to control the corresponding position of said front wheels of the tricycle in those circumstances by means of the handles on the lateral handlebars; while during slow ascents over rough and irregular terrain, the position in regard to the height of the front wheels of the tricycle is likewise adapted to the corresponding support at each point on the ground, with control by the user by means of the handles on the lateral handlebars, enabling the user to maintain adequate stability in the movement when riding in these circumstances; and in the case of rapid descents, the user can control the ride by means of the central handlebar, at the same time as the front wheels of the tricycle adapt by themselves to the support position that corresponds to each point of the terrain, allowing efficient control of the ride in these circumstances.

For all of these reasons, the disclosed tricycle provides several functional features that make it advantageous for the application of use on terrains of any type, giving it its own entity and preference over the conventional tricycles that have been developed for this application.

DETAILED DESCRIPTION OF THE INVENTION

Figure 1:
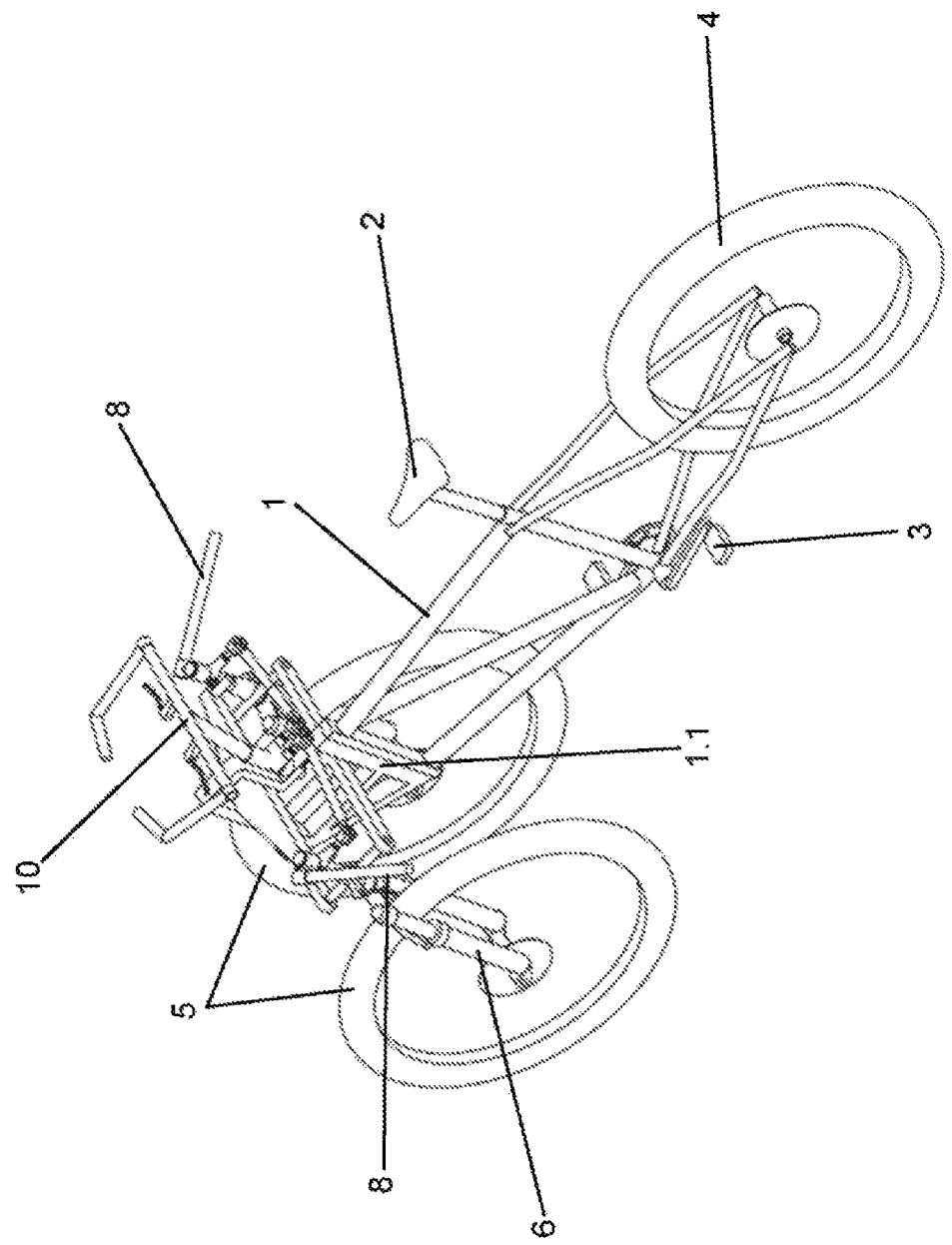
FIG. 1 shows a perspective view of an embodiment of a tricycle according to the object of the invention.
Figure 2:
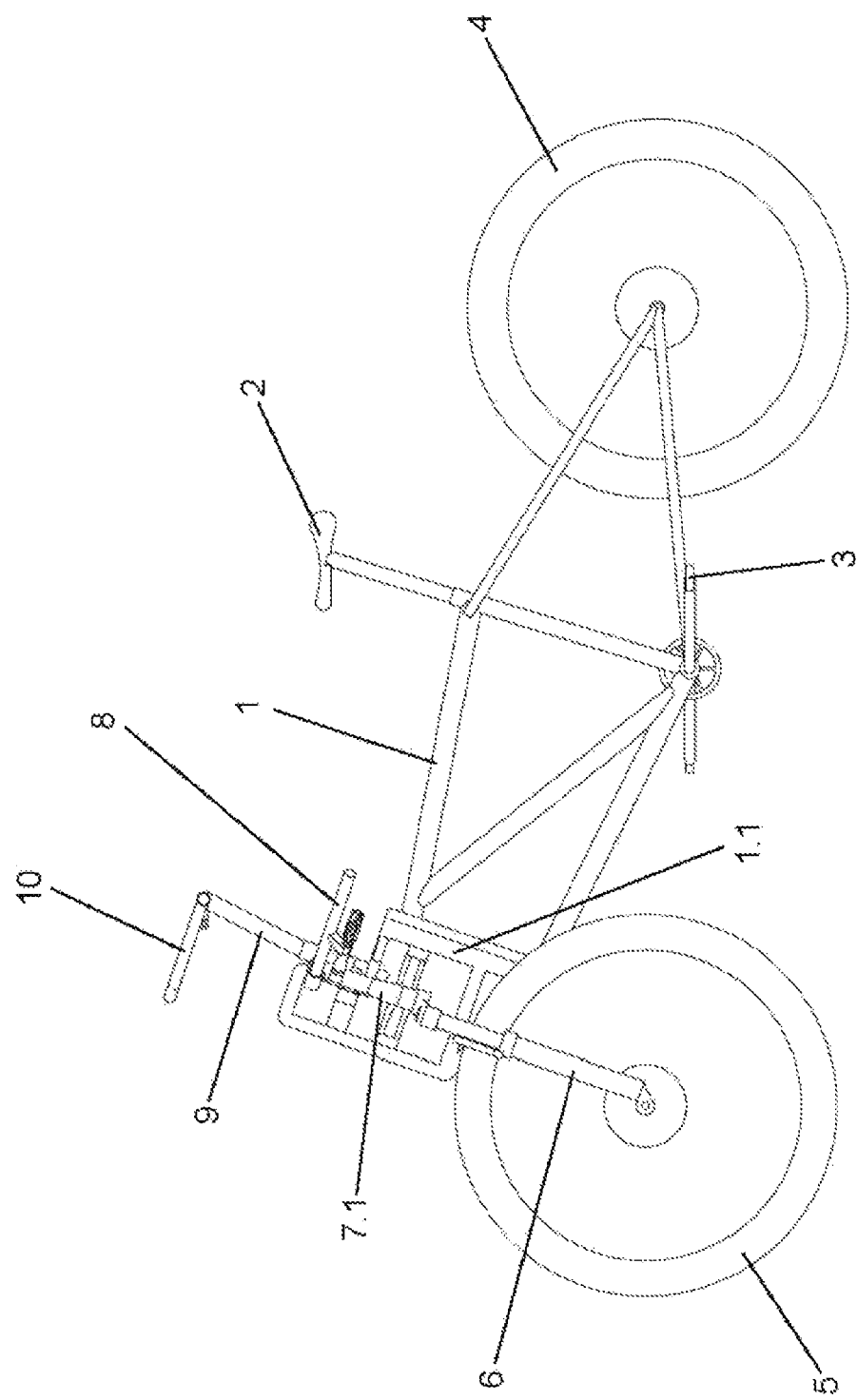
FIG. 2 is a side view of the tricycle of the previous figure.
Figure 3:
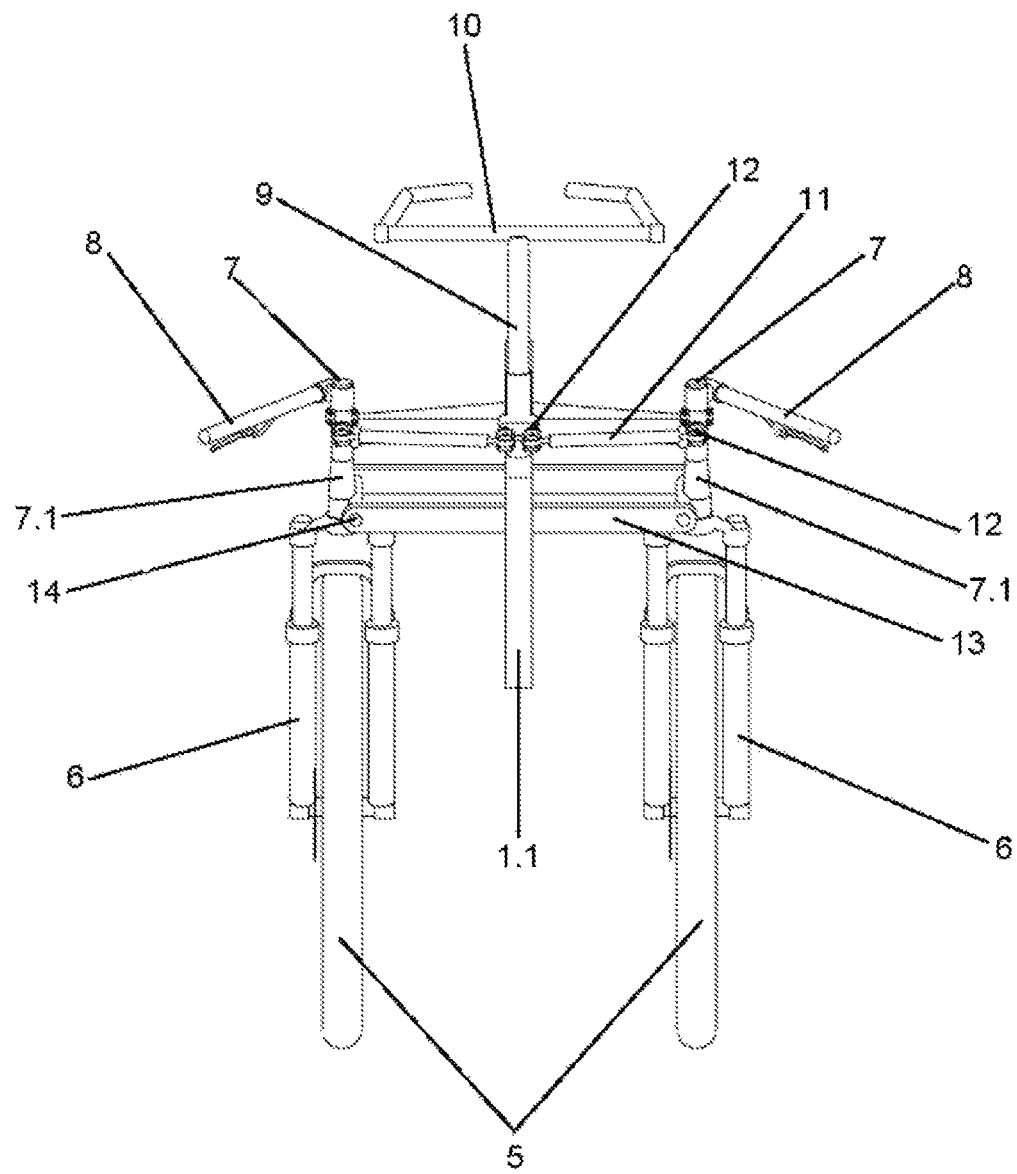
FIG. 3 is a detail view of the front part of the tricycle viewed from behind.

The object of the invention relates to a tricycle that allows riding in adequate conditions over any type of terrain, comprising a structural frame (1) onto which a seat (2) and several pedals (3) are incorporated, being equipped with a rolling assembly made up of one rear wheel (4) and two parallel front wheels (5), with the front wheels (5) incorporated into two mounting forks (6) equipped with several respective stems (7) projecting upwards.

Said stems (7) of the forks (6) of the front wheels (5) incorporate several handles (8) at the upper end that serve as lateral handlebars to control the positioning of the aforementioned front wheels (5), while these stems (7) of the forks (6) of the front wheels (5) are connected to a lower stem (9) of a central handlebar (10), by means of a set of rods (11), which establish a connection with the aforementioned stems (7) of the forks (6) of the front wheels (5) and with the aforementioned lower stem (9) of the central handlebar (10), by means of ball joints (12).

In addition, several crossbars (13) extend between both stems (7) of the forks (6) of the front wheels (5), connected at their ends to several tubes (7.1) that are positioned with the possibility of rotating on said stems (7) of the forks (6) of the front wheels (5) and centrally on a substructure (1.1) of the structural frame (1), by means of pivoting joints (14).

Figure 4:
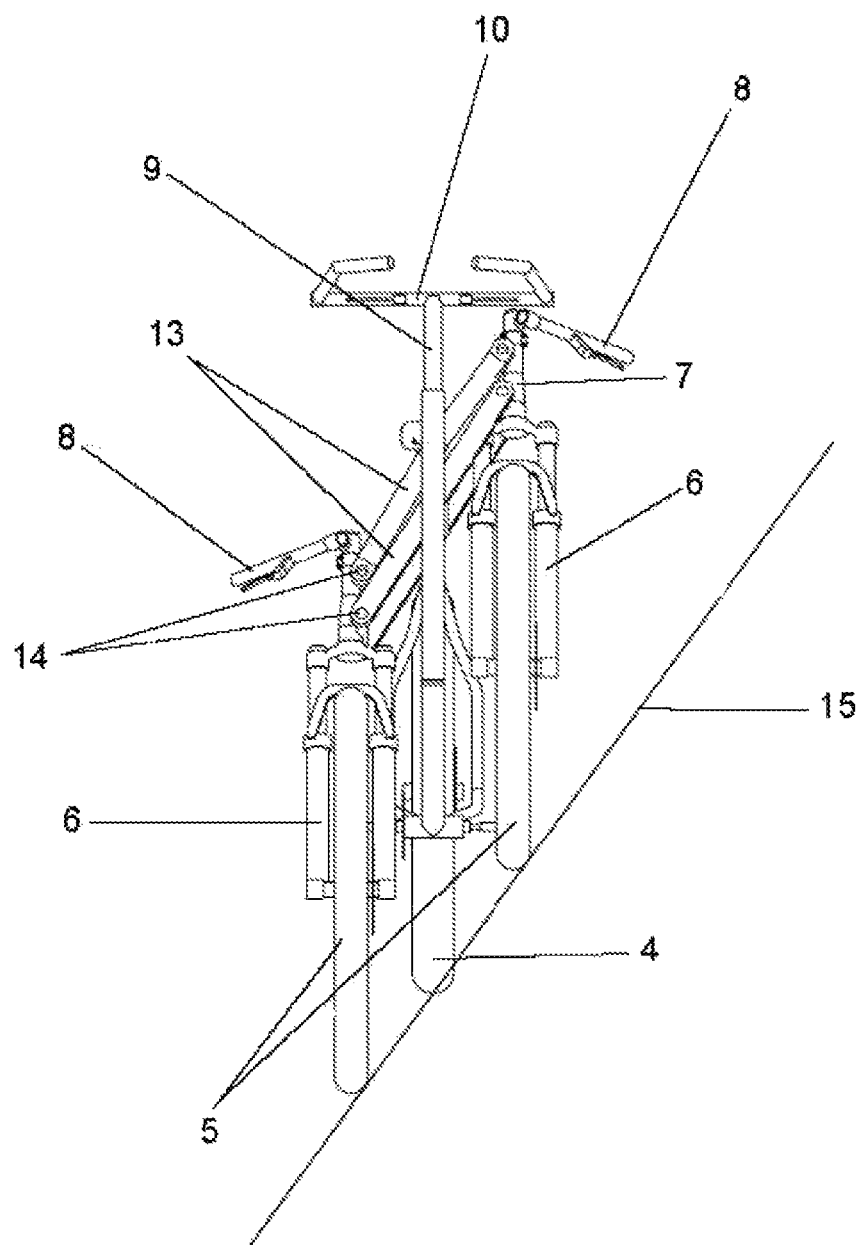
FIG. 4 is a front view of the tricycle travelling over laterally sloping terrain.

With this arrangement, the tricycle is suitable for travelling, for example, over terrain (15) that is laterally sloping, as shown in FIG. 4, because in these circumstances, the front wheels (5) of the tricycle adjust their height based on the position that each one of them requires to be supported on the ground, even if the ground presents irregularities, enabling the user to adequately control the ride by means of the use of lateral handles (8), which can be used to control the steering of the front wheels (5) and at the same time, exercise an action to keep said front wheels (5) supported on the ground, with the weight duly distributed between the two wheels and making it possible to maintain balance.

Figure 5:
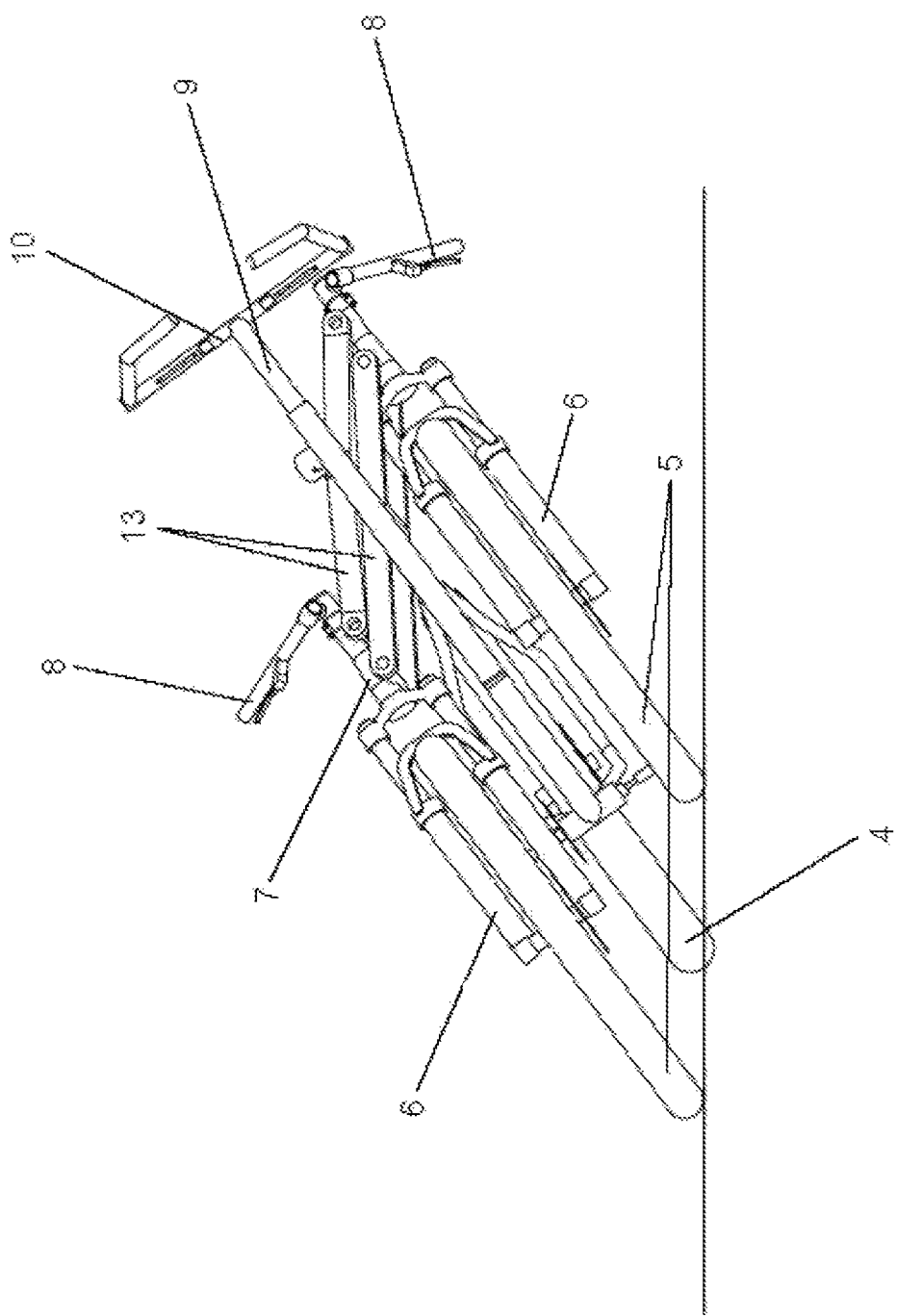
FIG. 5 is a front view of the tricycle in an inclined position while turning at high speed.

Using the central handlebar (10), the ride can also be adequately controlled during turns at high speed, on any type of terrain (15), because in these circumstances the tilt of the tricycle for moving in the turns causes the front wheels (5) to tilt, with each one adopting the position that corresponds to them in the position on the tricycle, to maintain the support contact of each one on the ground, as shown in FIG. 5.

Figure 6:
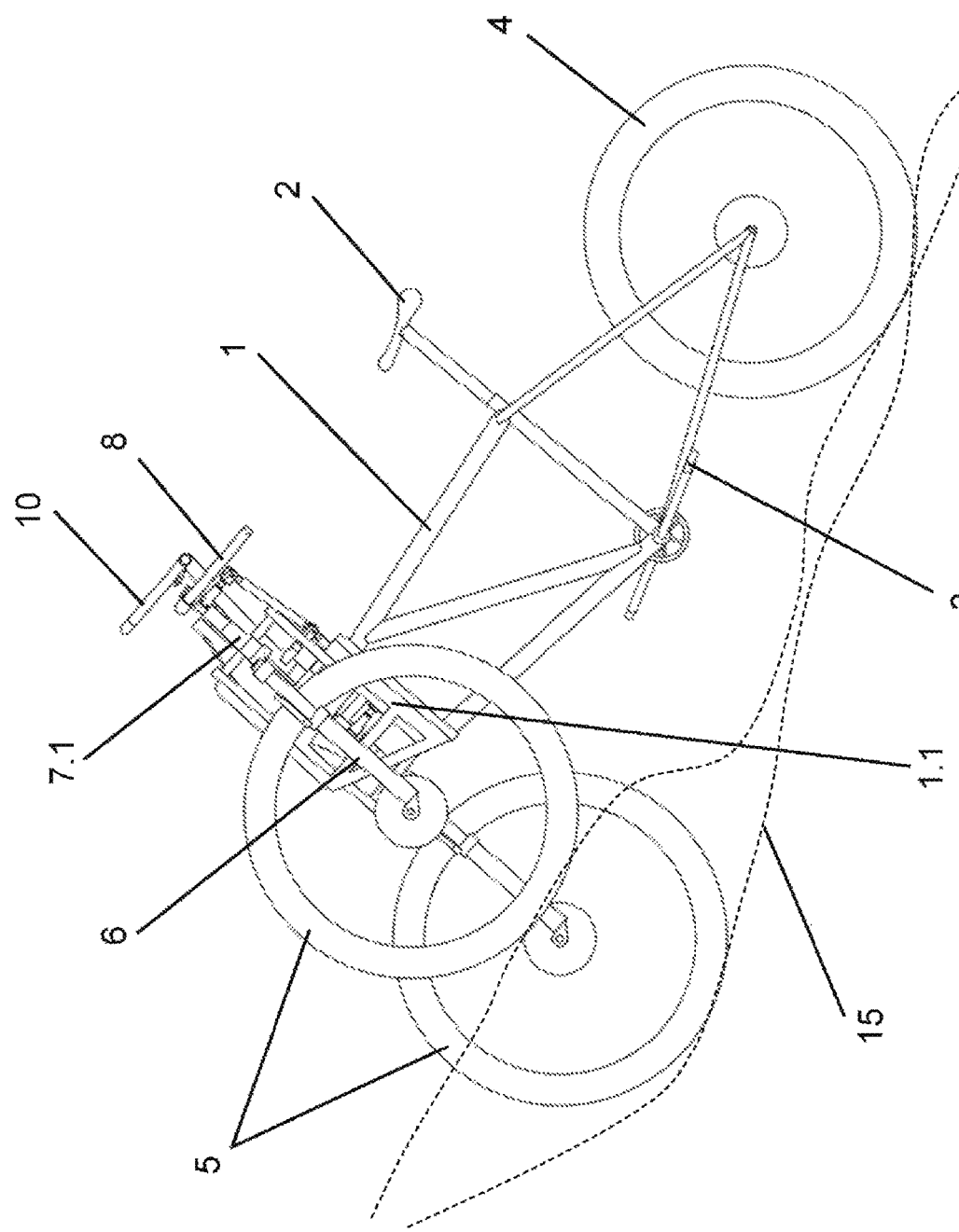
FIG. 6 is a side view of the tricycle in a situation of travel uphill on a slope with irregularities.

When ascending through irregular sloping terrain (15), as shown in FIG. 6, stability can also be effectively maintained when travelling at low speed, because in these circumstances the user can use the lateral handles (8) for riding, which can adequately steer the front wheels (5) and at the same time exert an action to adapt the position in terms of the height of each one of said front wheels (5) and distribute the weight between said front wheels (5), even allowing the centre of gravity (17) to shift laterally and thus maintain balance event without having effective steering to maintain balance at low speeds.

Figure 8:
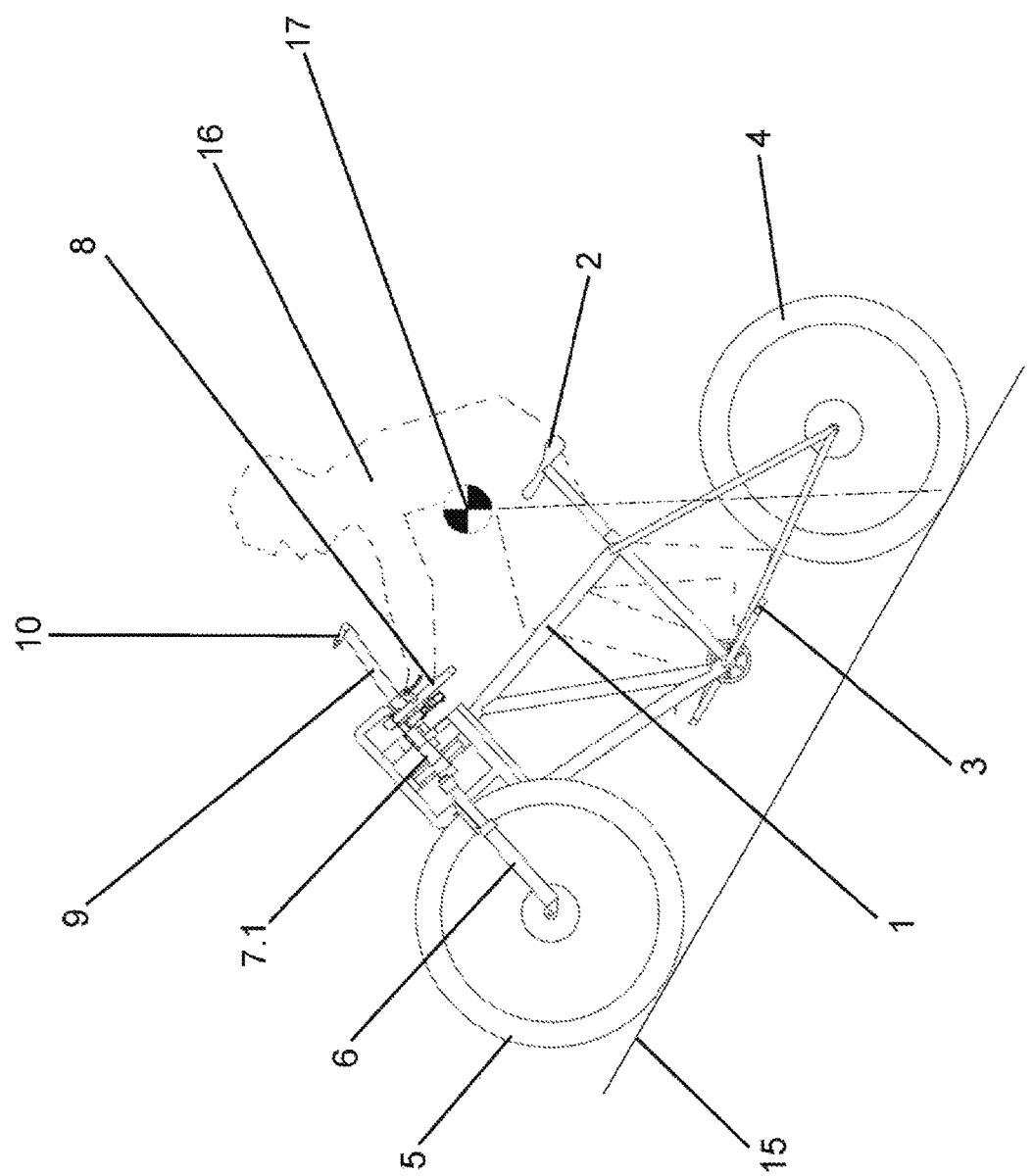
FIG. 8 is a side view of the tricycle in a position of travel uphill on a slope, showing the control of the steering by the user by means of the handles on the lateral handlebars.

When ascending over upward sloping terrain (15), the cyclist (16) user of the tricycle can also maintain balance safely because the vertical projection of the centre of gravity (17) can be kept within the triangle defined between the rear wheel (4) and the front wheels (5) of the tricycle, as shown in FIG. 8, with the cyclist (16) able to move their body forward if necessary, and also vary the vertical force on the lateral handles (8), which makes it possible to reduce the upward speed depending on their fitness, without losing stability.

Figure 7:
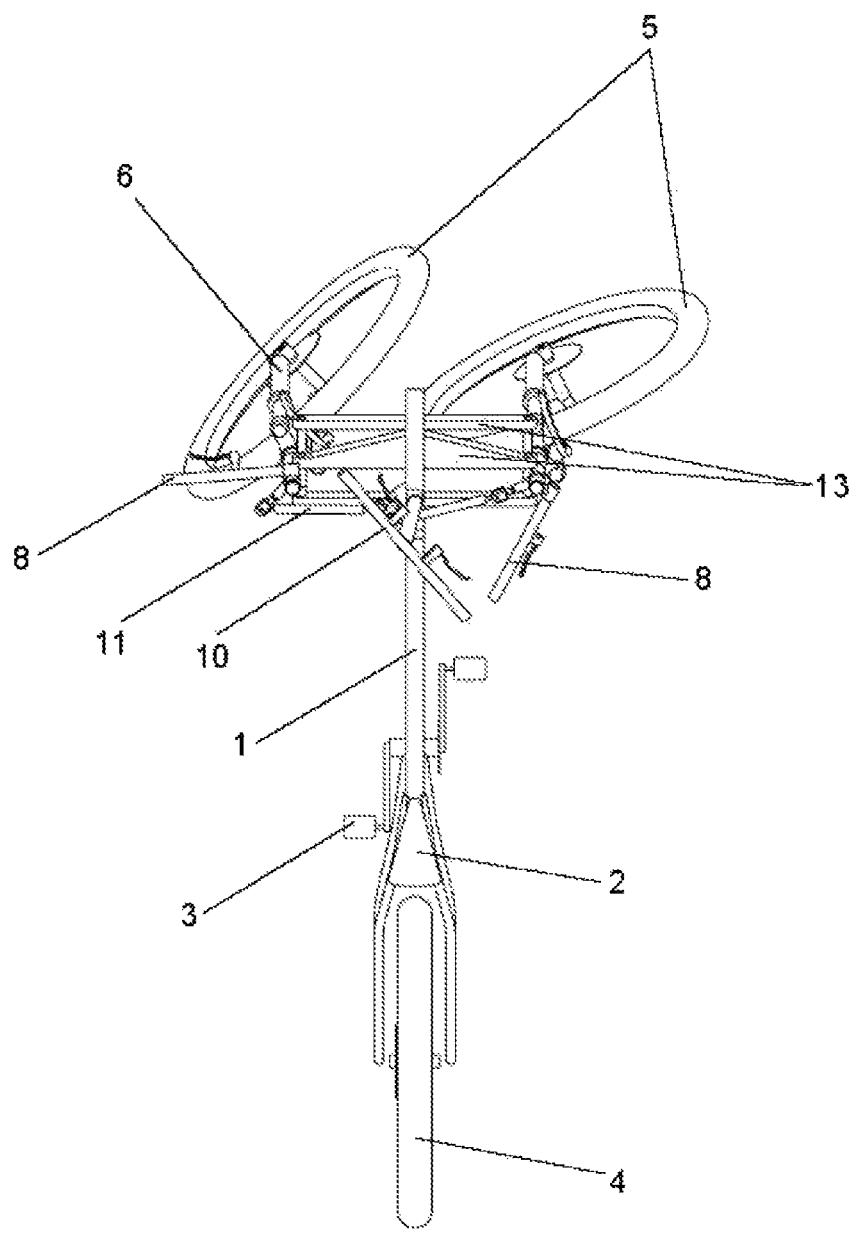
FIG. 7 is an overhead plan view of the tricycle with the front wheels oriented in a position of turning while riding.

In normal riding conditions, with the central handlebar (10), the front wheels (5) of the tricycle can be steered, such that in turns, said central handlebar (10) turns at an angle different from the aforementioned front wheels (5), which rotate in turn at different angles with respect to each other, depending on the direction of rotation, as shown in FIG. 7.

Figure 9:
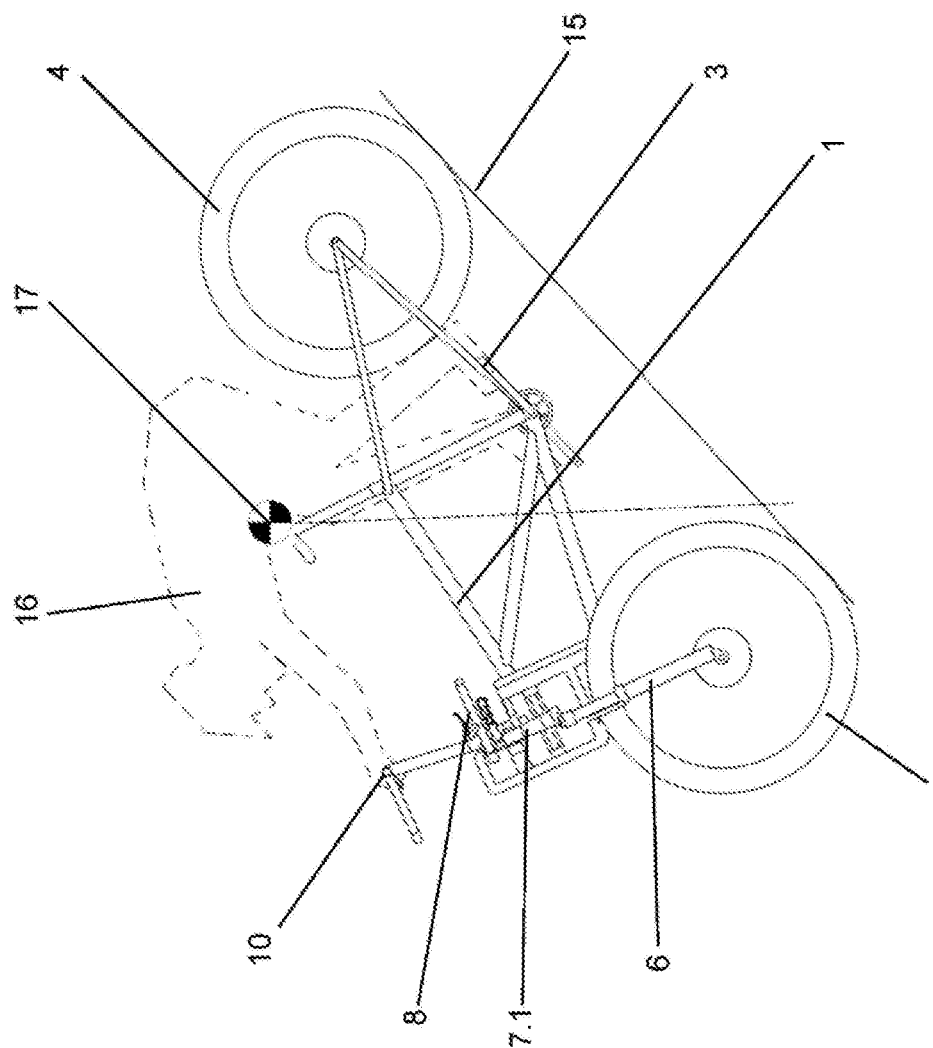
FIG. 9 is a side view of the tricycle in a position of travel downhill on a slope, showing the control of the steering by the user by means of the central handlebar.

When riding over downward sloping terrain (15), the cyclist (16) can support a large part of their weight on the central handlebar (10), shifting the centre of gravity (17) further back, so that its vertical projection falls within the triangle defined between the rear wheel (4) and the front wheels (5), as shown in FIG. 9, making it possible to travel safely at high speed over obstacles.

According to one embodiment, as shown in FIGS. 11 to 14, the steering system of the front wheels (5) of the tricycle by means of the central handlebar (10) comprises several rods (11) that are connected, by means of ball joints (12), to several cantilevers (18) that protrude from the lower stem (9) of the central handlebar (10) and from the stems (7) of the forks (6) on which the aforementioned front wheels (5) are mounted.

Likewise, the system for tilting the height of the aforementioned front wheels (5) of the tricycle is made up of a lower pair of crossbars (13) that form a jointed quadrilateral connected by means of pivoting joints (14) to the substructure (1.1) of the structural frame (1) and on the tubes (7.1) arranged on the stems (7) of the forks (6) on which the front wheels (5) are mounted and another upper crossbar (13), in turn, connected by means of pivoting joints (14) to the tubes (7.1) arranged on the stems (7) of the forks (6) on which the front wheels (5) are mounted and to the substructure (1.1) of the structural frame (1).

Figure 15:
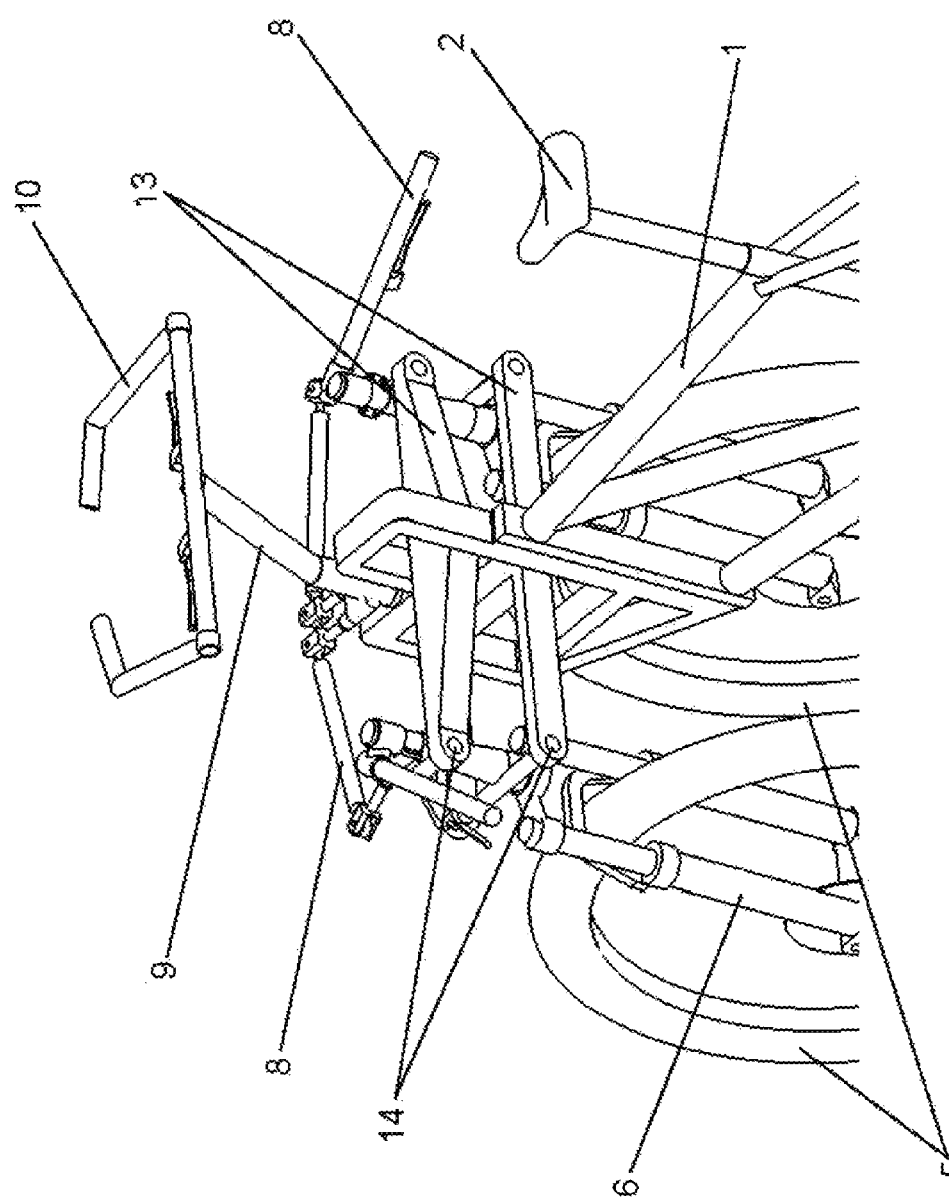
FIG. 15 is a partial perspective of a different exemplary embodiment of the tricycle that is the object of the invention.

Nevertheless, there may be other embodiments that likewise comply with the objective of the invention, for example, as shown in FIG. 15, with the upper crossbar (13) of the system for the tilting of the height of the front wheels (5) positioned behind the lower stem (9) of the central handlebar (10).

Figure 10:
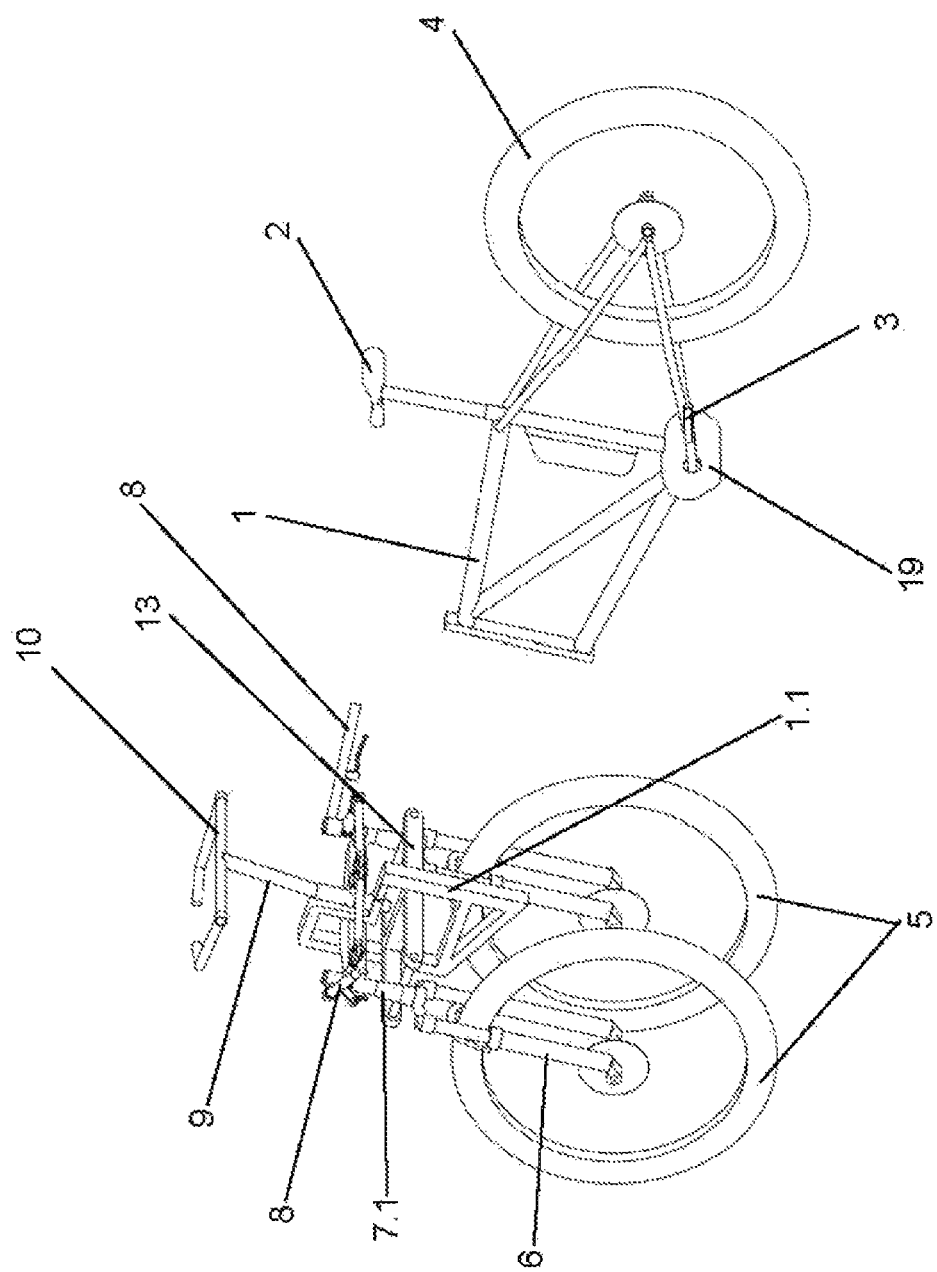
FIG. 10 is a perspective view of an embodiment of the tricycle with the structural frame divided into two separable parts.
Figure 11:
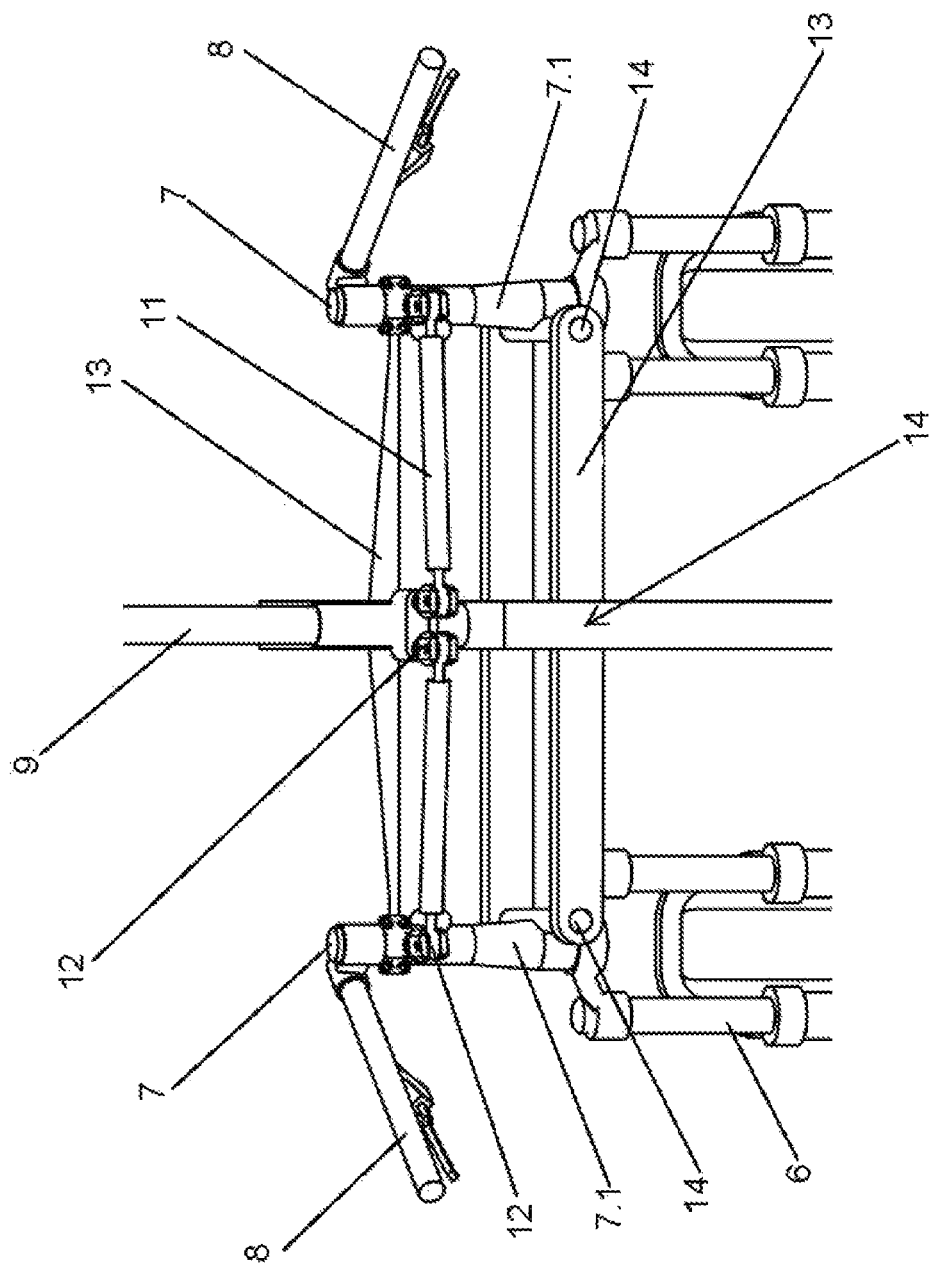
FIG. 11 is a partial expanded detail view of the assembly in FIG. 3.
Figure 12:
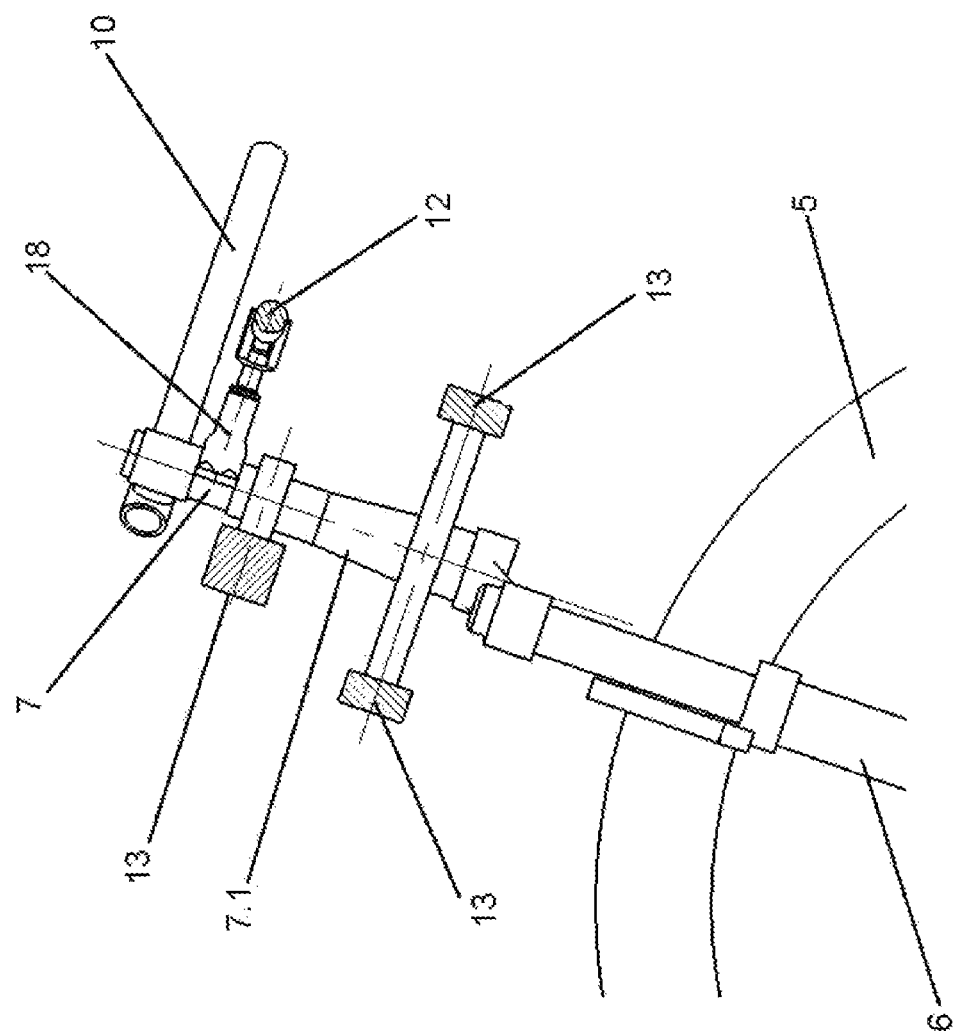
FIG. 12 is a cross-section side view of the detail of the previous figure.
Figure 13:
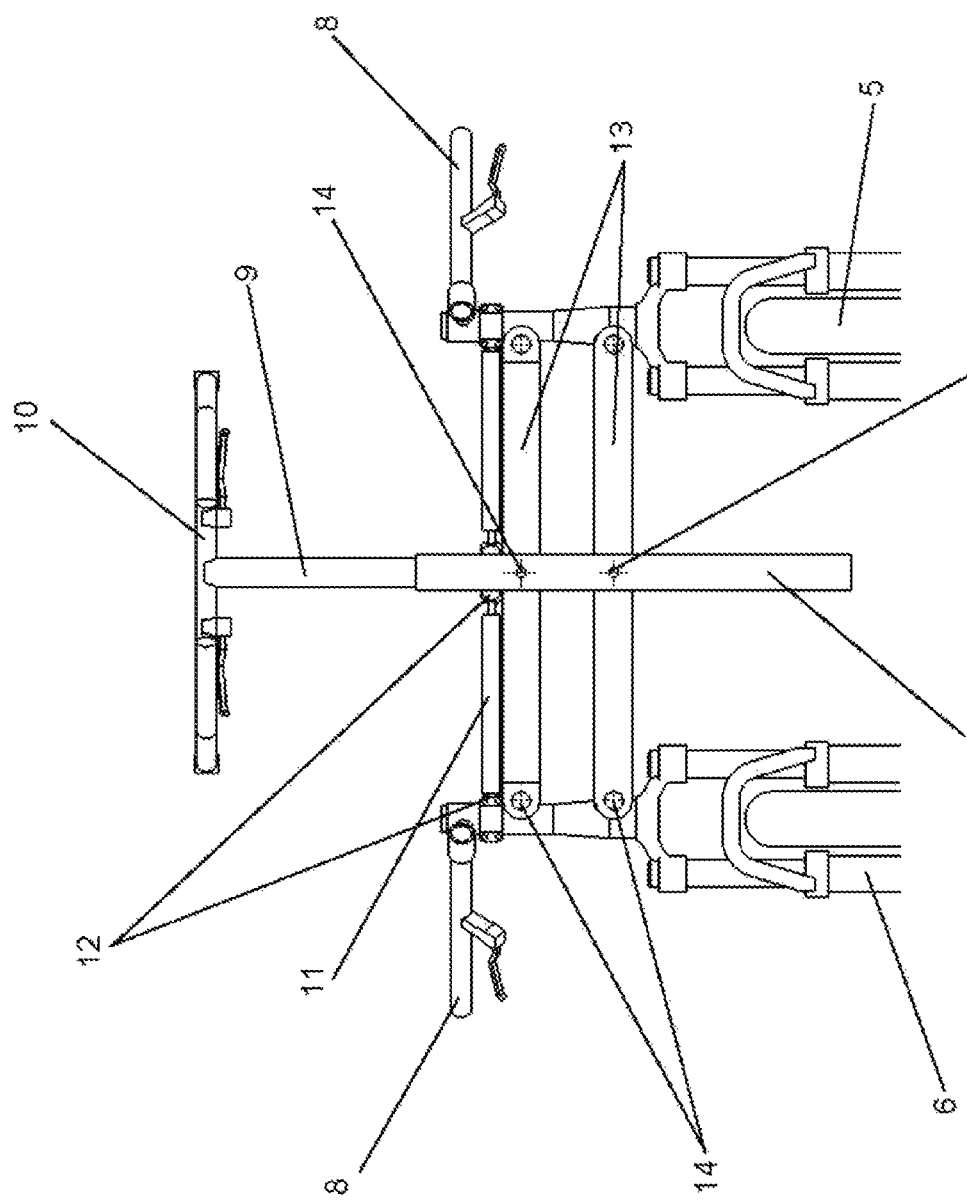
FIG. 13 is a simplified front view of the tricycle, showing the details of the tilting height system of the front wheels.
Figure 14:
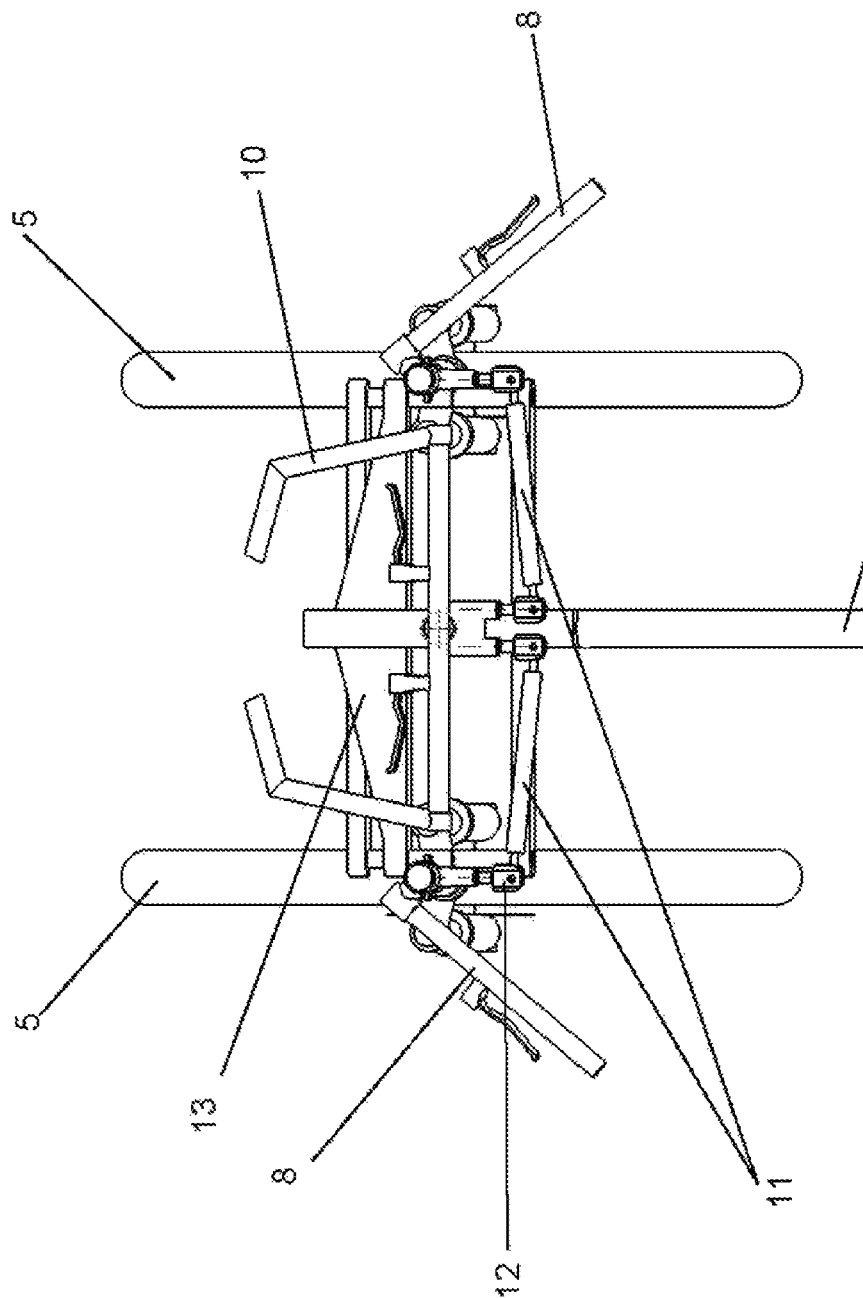
FIG. 14 is an expanded detail view of the top view of the front part of the tricycle.

Another embodiment is considered, as shown in FIG. 10, with the structural frame (1) of the tricycle formed by two separable parts, to allow the tricycle to be disassembled in such a way as to facilitate storage and transport.

In the functional order of the drive for the propulsion of the tricycle, complementing the system of propulsion by means of pedals (3), it may also incorporate a motor (19) to collaborate with motorised propulsion that allows the cyclist (16) user of the tricycle to reduce their effort.

The invention claimed is:

1. A tricycle with dual steering handlebars, comprising a structural frame onto which a rolling assembly is incorporated made up of one rear wheel associated with a propulsion system by means of pedals and two parallel front wheels that are incorporated into two mounting forks associated with a steering system and a tilting height system, wherein the forks into which the front wheels are inserted have several respective stems projecting upwards, which have several handles incorporated onto them at the top to function as lateral handlebars, with said stems connected by means of several rods that form ball joints with a lower stem of a central handlebar, while between the rods several crossbars extend, which are joined at their ends to several tubes arranged with the possibility of rotating on said stems and centrally to a substructure of the structural frame, by means of pivoting joints.

2. The tricycle with dual steering handlebars, according to claim 1, wherein the ball joints of the rods are set on cantilevers that protrude from the stems of the forks on which the front wheels are incorporated and from the lower stem of the central handlebar.

3. The tricycle with dual steering handlebars, according to claim 1, wherein the tilting height system of the front wheels is made up of two lower crossbars that are arranged in a jointed quadrilateral connected to the tubes of the stems of the forks onto which the front wheels are incorporated and to the substructure of the structural frame and an upper crossbar that is connected to the tubes of the stems of the forks into which the front wheels are incorporated and to the substructure of the structural frame, positioned in front of or behind the lower stem of the central handlebar.

4. The tricycle with dual steering handlebars, according to claim 1, wherein the structural frame is made up of two parts that can be separated.

5. The tricycle with dual steering handlebars, wherein the propulsion system by means of pedals is complemented by a motor to collaborate with motorised propulsion that allows the cyclist user of the tricycle to reduce their effort.

\* \* \* \* \*